(12) United States Patent
Kim et al.

(10) Patent No.: US 9,262,263 B2
(45) Date of Patent: Feb. 16, 2016

(54) BIT RECOVERY SYSTEM

(71) Applicant: QUALCOMM Incorporated, San Diego, CA (US)

(72) Inventors: Taehyun Kim, San Diego, CA (US); Jung Pill Kim, San Diego, CA (US); Sungryul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 14/088,867

(22) Filed: Nov. 25, 2013

(65) Prior Publication Data

US 2015/0149864 A1    May 28, 2015

(51) Int. Cl.
*G11C 29/00*    (2006.01)
*G06F 11/10*    (2006.01)
*G06F 12/00*    (2006.01)

(52) U.S. Cl.
CPC .......... *G06F 11/102* (2013.01); *G06F 11/1064* (2013.01); *G06F 12/00* (2013.01)

(58) Field of Classification Search
CPC ... G06F 11/102; G06F 11/1064; G06F 12/00; G06F 11/1048; G06F 12/0802; G06F 12/0875; G06F 12/0864; G06F 12/0848; G06F 12/123; G06F 12/0895; G06F 12/0879; G06F 12/0804; G06F 2212/601; G06F 2212/6046; G11C 16/26; G11C 29/808; G11C 15/00
See application file for complete search history.

(56) References Cited

U.S. PATENT DOCUMENTS

| | | | |
|---|---|---|---|
| 5,912,906 A | 6/1999 | Wu et al. | |
| 6,651,212 B1 | 11/2003 | Katayama et al. | |
| 6,996,017 B2 | 2/2006 | Scheuerlein et al. | |
| 7,096,407 B2 | 8/2006 | Olarig | |
| 7,266,747 B2 | 9/2007 | Foss | |
| 7,408,824 B2 | 8/2008 | Hoya et al. | |
| 7,721,140 B2 | 5/2010 | Dell et al. | |
| 8,195,978 B2 | 6/2012 | Flynn et al. | |
| 8,413,007 B2 | 4/2013 | Pawlowski et al. | |
| 8,418,026 B2 | 4/2013 | D'Abreu et al. | |
| 2003/0070054 A1 | 4/2003 | Williams et al. | |
| 2003/0200404 A1* | 10/2003 | Wicki et al. | 711/156 |
| 2007/0168836 A1* | 7/2007 | Dempsey et al. | 714/763 |

(Continued)

FOREIGN PATENT DOCUMENTS

JP    2001175542 A    6/2001

OTHER PUBLICATIONS

Tanzawa T. et al., "A Compact On-Chip ECC for Low Cost Flash Memories," IEEE Jounal of Solid-State Circuits, May 1997, vol. 32 (5), pp. 662-669.

(Continued)

*Primary Examiner* — Guerrier Merant
(74) *Attorney, Agent, or Firm* — Toler Law Group (57) ABSTRACT

A particular device includes a resistance-based memory device, a tag random-access memory (RAM), and a bit recovery (BR) memory. The resistance-based memory device is configured to store a data value and error-correcting code (ECC) data associated with the data value. The tag RAM is configured to store information that maps memory addresses of a main memory to wordlines of a cache memory, where the cache memory includes the resistance-based memory device. The BR memory is configured to store additional error correction data associated with the data value, where the BR memory corresponds to a volatile memory device.

35 Claims, 5 Drawing Sheets

(56) References Cited

U.S. PATENT DOCUMENTS

| | | |
|---|---|---|
| 2008/0163008 A1* | 7/2008 | Jacob .......................... 714/699 |
| 2009/0164727 A1 | 6/2009 | Penton et al. |
| 2010/0058144 A1 | 3/2010 | Rohleder et al. |
| 2010/0287446 A1 | 11/2010 | Post et al. |
| 2011/0047408 A1 | 2/2011 | Gille et al. |
| 2011/0072332 A1 | 3/2011 | Tomlin |
| 2013/0024744 A1 | 1/2013 | Takizawa |
| 2013/0117631 A1 | 5/2013 | Gruner et al. |
| 2014/0040531 A1* | 2/2014 | Wu et al. ....................... 711/103 |
| 2014/0089602 A1* | 3/2014 | Biswas et al. ................. 711/144 |
| 2014/0143498 A1* | 5/2014 | Olson et al. ................... 711/132 |

OTHER PUBLICATIONS

Yoon, D.H. et al., "Flexible Cache Error Protection using an ECC FIFO," Proceedings of SC'09, Nov. 11-20, 2009, pp. 1-12.
International Search Report and Written Opinion—PCT/US2014/064574—ISA/EPO—Feb. 11, 2015.

* cited by examiner

BIT RECOVERY SYSTEM

I. FIELD

The present disclosure is generally related to a bit recovery system.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A computing device may include a memory (e.g., magnetoresistive random-access memory (MRAM)) used to store data. A MRAM device may include magnetic tunnel junction (MTJ) devices as storage elements. MTJ devices include a free layer and a fixed layer and may store data based on an orientation of the free layer relative to the fixed layer. For example, a MTJ device may store a logic zero when the free layer and the fixed layer of the MTJ device are magnetized in the same direction (e.g., parallel state). The logic zero may be detected during a read operation by determining that a resistance of the MTJ device is in a certain range. The MTJ device may store a logic one when the free layer is magnetized in a direction opposite the magnetization of the fixed layer (e.g., an anti-parallel state). The logic one may be detected during a read operation by determining that the resistance of the MTJ device is in a second, higher range (because a MTJ device in the anti-parallel state has higher resistance than a MTJ device in the parallel state). The MTJ device further includes an insulating layer positioned between the free layer and the fixed layer. For example, the insulating layer may be formed of magnesium oxide (MgO).

Data errors may occur at the memory, causing data read from the memory to differ from data written to the memory. The data errors may be transient (e.g., data errors that may be corrected by rewriting the data to the memory), or the data errors may be recurring (e.g., data errors that may not be corrected by rewriting the data to the memory). For example, a recurring data error may be caused by a breakdown of the insulating layer (e.g., when the MTJ is overstressed by a write voltage). When the insulating layer breaks down, a path formed between the free layer and the fixed layer in the MTJ device may be short circuited, causing the resistance of the MTJ device to be stuck at a very low value. When the resistance of the MTJ device is stuck at a very low value, read operations may always detect a logic zero at the MTJ device.

The memory may include an error correction code (ECC) module configured to correct errors at the memory. However, the ECC module may only be able to correct a particular number of errors (e.g., a single erroneous bit in a 32-bit word). When a number of data errors at the memory exceeds the number of errors the ECC module can correct, a hard failure may occur. One method of handling a hard failure may include using redundant or mirrored memory devices (e.g., redundant or mirrored MTJ devices).

III. SUMMARY

This disclosure presents embodiments of a bit recovery system. The bit recovery system may include a resistance-based memory device (e.g., a cache memory), a tag random-access memory (RAM), and a bit recovery (BR) memory. The resistance-based memory device may be a device that stores data values based on a resistance of a memory element (e.g., a magnetic tunnel junction (MTJ) memory element). The resistance-based memory device may store a data value and error-correcting code (ECC) data associated with the data value. The tag RAM may store information that maps memory addresses of a main memory to wordlines of the resistance-based memory device. The BR memory may store additional error correction data associated with the data value. A volatile memory device (e.g., static random-access memory (SRAM)) may include the tag RAM and the BR memory and may provide a mapping to a particular wordline together with additional error correction data associated with the particular wordline. An electronic device including the bit recovery system may be able to recover from a hard fail without using a redundant memory device or a mirrored memory device. The electronic device may further use the BR memory to correct a data error more quickly, as compared to an electronic device that corrects the data error using only ECC data.

In a particular embodiment, an apparatus includes a resistance-based memory device configured to store a data value and error-correcting code (ECC) data associated with the data value. The apparatus further includes a tag random-access memory (RAM) configured to store information that maps memory addresses of a main memory to wordlines of a cache memory, where the cache memory includes the resistance-based memory device. The apparatus further includes a bit recovery (BR) memory configured to store additional error correction data associated with the data value, where the BR memory corresponds to a volatile memory device.

In another particular embodiment, a method includes receiving tag information that maps a main memory address corresponding to a data value to a wordline of a non-volatile memory device. The method further includes receiving bit recovery (BR) data associated with the data value from a BR memory, where the BR memory corresponds to a volatile memory device. The method further includes requesting the data value from the non-volatile memory device after receiving the tag information. The method further includes receiving the data value and error-correcting code (ECC) data associated with the data value from the non-volatile memory device, where the BR data is distinct from the ECC data. The method further includes performing a first error correction operation to correct a first erroneous bit of the data value based on the BR data.

In another particular embodiment, an apparatus includes means for storing a data value and error-correcting code (ECC) data associated with the data value. The apparatus further includes means for storing mapping information that maps memory addresses of means for storing main data to wordlines of means for storing cache data, where the means for storing cache data includes the means for storing the data value and the ECC data. The apparatus further includes means for storing recovery bits that stores additional error correction data associated with the data value, where the means for storing recovery bits includes a volatile memory device.

In another particular embodiment, a method includes a step for receiving tag information that maps a main memory address corresponding to a data value to a wordline of a non-volatile memory device. The method further includes a step for receiving bit recovery (BR) data associated with the data value from a BR memory, where the BR memory corresponds to a volatile memory device. The method further includes a step for requesting the data value from the non-volatile memory device after receiving the tag information. The method further includes a step for receiving the data value and error-correcting code (ECC) data associated with the data value from the non-volatile memory device, where the BR data is distinct from the ECC data. The method further includes a step for performing a first error correction operation to correct a first erroneous bit of the data value based on the BR data.

In another particular embodiment, a non-transitory computer readable medium stores instructions that, when executed by a processor, cause the processor to receive tag information that maps a main memory address corresponding to a data value to a wordline of a non-volatile memory device. The non-transitory computer readable medium further stores instructions that, when executed by the processor, cause the processor to receive bit recovery (BR) data associated with the data value from a BR memory, where the BR memory corresponds to a volatile memory device. The non-transitory computer readable medium further stores instructions that, when executed by the processor, cause the processor to request the data value from the non-volatile memory device after receiving the tag information. The non-transitory computer readable medium further stores instructions that, when executed by the processor, cause the processor to receive the data value and error-correcting code (ECC) data associated with the data value from the non-volatile memory device, where the BR data is distinct from the ECC data. The non-transitory computer readable medium further stores instructions that, when executed by the processor, cause the processor to perform a first error correction operation to correct a first erroneous bit of the data value based on the BR data.

In another particular embodiment, a method includes receiving a data file including design information corresponding to an electronic device. The method further includes fabricating the electronic device according to the design information. The electronic device includes a resistance-based memory device configured to store a data value and error-correcting code (ECC) data associated with the data value. The electronic device further includes a tag random-access memory (RAM) configured to store information that maps memory addresses of a main memory to wordlines of a cache memory, where the cache memory comprises the resistance-based memory device. The electronic device further includes a bit recovery (BR) memory device configured to store additional error correction data associated with the data value, where the BR memory corresponds to a volatile memory device.

One particular advantage provided by at least one of the disclosed embodiments is that an electronic device including the bit recovery system may use the BR memory to correct a data error and an error correction code (ECC) module to correct another data error. Thus, the electronic device may recover from a hard fail while the electronic device is operating and without using a redundant memory device or a mirrored memory device. The electronic device may further use the BR memory to correct a data error more quickly, as compared to an electronic device that corrects the data error using only ECC data.

Other aspects, advantages, and features of the present disclosure will become apparent after review of the entire application, including the following sections: Brief Description of the Drawings, Detailed Description, and the Claims.

V. DETAILED DESCRIPTION

Figure 1:
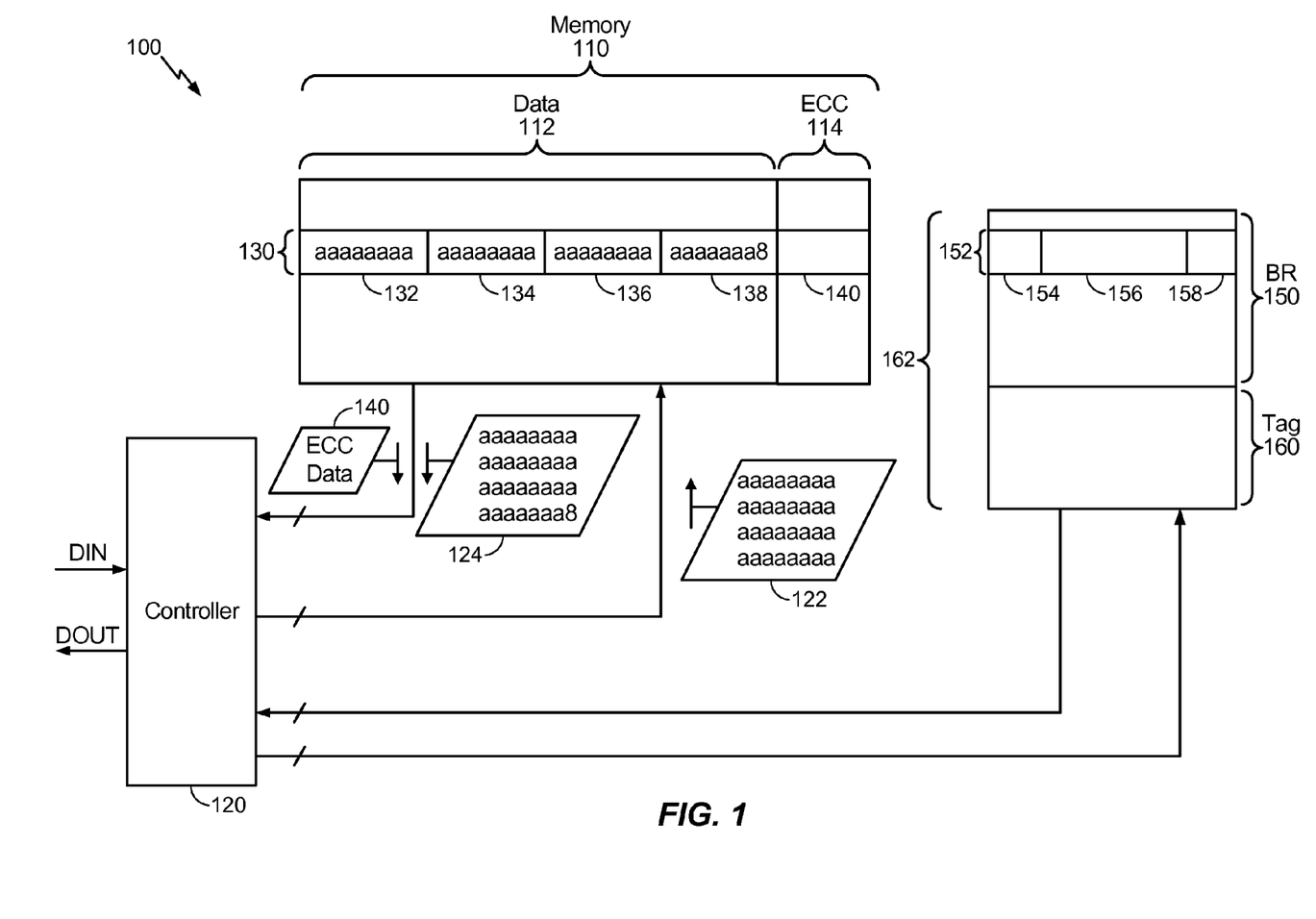
FIG. 1 is a diagram depicting a particular embodiment of a system including a memory, a tag memory, and a bit recovery memory.

Referring to FIG. 1, a particular illustrative embodiment of a system 100 including a controller 120, a resistance-based memory device 110 (e.g., a cache memory), and a total tag memory 162 that includes a bit recovery (BR) memory device 150 and a tag random-access memory (RAM) 160 is shown. The resistance-based memory device 110 may include one or more rows, such as a representative row 130. The resistance-based memory device 110 may further include a data portion 112 and an error correcting code (ECC) portion 114. A data portion of each row of the resistance-based memory device 110 may correspond to the data portion 112. An ECC portion of each row of the resistance-based memory device 110 may correspond to the ECC portion 114. Data stored at the ECC portion of a row may correspond to data stored at the data portion of the row. In the example illustrated in FIG. 1, the row 130 includes a data portion including a first word 132, a second word 134, a third word 136, and a fourth word 138. In this example, the row 130 further includes an ECC portion including ECC data 140 that corresponds to data stored in the data portion.

The ECC data 140 may be used by the controller 120 to correct a particular number of erroneous bits (e.g., a one-bit error caused by a read or write failure) per word. For example, each of the words 132-138 may include 32-bit words of data. In this example, a first 6 bits of the ECC data 140 may be used by the controller 120 to correct one erroneous bit included in the first word 132, a second 6 bits of the ECC data 140 may be used by the controller 120 to correct one erroneous bit included in the second word 134, etc. Thus, in this example, a read or write operation for the resistance-based memory device 110 involves a total of 152 bits (e.g., the 128 bits of data and the 24 bits of ECC data).

In a particular embodiment, the resistance-based memory device 110 is a 64 kilobyte (kb) magnetoresistive random-access memory (MRAM) device having 4 k (4096) rows that each include 128 bits of data divided into four 32-bit words of data and 24 bits of ECC data. Alternatively, the resistance-based memory device 110 may include more rows or fewer rows and each row may include more bits or fewer bits. Data stored in each row of the resistance-based memory device 110 may be divided into other sizes (e.g., the data may be divided into 16-bit halfwords or into 64-bit longwords). In another particular embodiment, the resistance-based memory device 110 is a Level 3 (L3) cache memory. Although one resistance-based memory device is shown in FIG. 1, in other embodiments, the system 100 may include more than one resistance-based memory device 110.

The total tag memory 162 includes the BR memory device 150 and the tag RAM 160. The total tag memory 162 may be a volatile memory device (e.g., static random-access memory (SRAM)). The tag RAM 160 may be a memory device that identifies data from a first memory (e.g., a main memory) that is stored in a portion of a second memory (e.g., a wordline of a cache memory). Thus, the tag RAM 160 may be configured to store information that maps memory addresses of the first memory (e.g., a main memory) to memory addresses of the second memory (e.g., wordlines of a cache memory). The tag RAM 160 may be accessed (e.g., by the controller 120) to determine whether the second memory (e.g., the resistance-based memory device 110) stores a data value corresponding to a memory address of the first memory. In a particular embodiment, when the resistance-based memory device 110 stores a data value corresponding to a main memory address, the tag RAM 160 may provide a memory address of the resistance-based memory device 110 (e.g., an address corresponding to the row 130) in response to receiving the main memory address. In the particular embodiment, when the resistance-based memory device 110 does not store a data value corresponding to the main memory address, the tag RAM 160 may provide a signal that indicates that the main memory address is not stored at the resistance-based memory device 110.

The BR memory device 150 may be a volatile memory device that includes a plurality of BR rows. Each row (e.g., a BR row 152) of the BR memory device 150 may correspond to a row of a memory device (e.g., the row 130 of the resistance-based memory device 110). Each of the BR rows of the BR memory device 150 may store information indicating whether a particular memory element (e.g., a MTJ device) of a corresponding row of the resistance-based memory device 110 has encountered a data error (e.g., an insulating layer breakdown). The information stored at the BR memory device 150 may be error correction data used to correct a data error associated with a corresponding data value at the resistance-based memory device 110. Although FIG. 1 illustrates a single memory device that stores data values (e.g., the resistance-based memory device 110), the BR memory device 150 may include BR rows corresponding to rows of more than one memory device that stores data values (e.g., four 64 kb MRAMs, where each MRAM includes 4 k 128-bit rows). The BR memory device 150 may be configured to provide the error correction data more quickly than a non-volatile BR memory device because volatile memory devices (e.g., SRAM devices) may be configured to respond to data requests more quickly than non-volatile memory devices (e.g., MRAM devices or phase-change random-access memory (PCRAM) devices) of corresponding size (e.g., devices that include a similar number of available storage locations).

In the example illustrated in FIG. 1, the BR memory device 150 includes the BR row 152. The BR row 152 may store information that indicates whether a particular memory element of the row 130 of the resistance-based memory device 110 has encountered a data error. The information stored at the BR row 152 may include first information 154 (e.g., a master bit) indicating whether a particular memory element of the row 130 has failed and second information 156 that identifies an address in the row 130 that has encountered a data error. For example, the first information 154 may be a master bit set to a binary 1 when a memory element failure has occurred in the row 130 and set to a binary 0 when a memory element failure has not been detected in the row 130. The second information 156 may identify a bit position corresponding to a failed memory element. In a particular embodiment, the BR memory device 150 may store a correct data value that should have been stored in the failed memory element as third information 158. For example, if a binary 1 is to be written to the failed memory element by the controller 120, the controller 120 may set the third information 158 (which may be a single bit) to the value of 1. Alternately, if a binary 0 is to be written to the failed memory element by the controller 120, the controller 120 may set the third information 158 to the value of 0.

During operation, the controller 120 may receive input data (DIN). The input data (DIN) may correspond to a data value to be written to a row of the resistance-based memory device 110. For example, as shown in FIG. 1, the controller 120 may perform a write operation to write a data value 122 (e.g., a hex "aaaaaaaaaaaaaaaaaaaaaaaaaaaaaaaa") to the data portion 112 of the row 130. As shown in FIG. 1, after the write operation is completed, the first word 132 may store a hex "aaaaaaaa" value, the second word 134 may store a hex "aaaaaaaa" value, and the third word 136 may store a hex "aaaaaaaa" value. The fourth word 138 may store a hex "aaaaaaa8" value instead of a hex "aaaaaaaa" value (e.g., a binary 0 instead of a binary 1 is stored at a bit position 1 of the fourth word 138). When the data value 122 is written to the row 130, the controller 120 may delete the information stored in the BR row 152 of the BR memory device 150.

At the time a write operation is completed at the resistance-based memory device 110, it may be unknown whether a data error (e.g., the hex "8" in the value stored in the fourth word 138) was caused by a transient data error or a recurring data error (e.g., an insulation layer failure of a MTJ device). The controller 120 may receive a refresh command from an external controller. In response to the refresh command, the controller 120 may perform a first read operation to retrieve a data value and ECC data from a row (e.g., the row 130) of the resistance-based memory device 110, perform error correction on the data value using the ECC data, and write the corrected data value to the row of the resistance-based memory device 110. After writing the corrected data to the row of the resistance-based memory device 110, the controller 120 may perform a second read operation to retrieve the data value and the ECC data from the row of the resistance-based memory device 110 again. The controller 120 may compare the corrected data value to the data value retrieved using the second read operation. If the data values do not match, and an error bit location of the first read operation corresponds to an error bit location of the second read operation, the controller 120 may determine that a recurring data error (e.g., a memory element failure) has occurred.

To illustrate, in response to a refresh command, the controller 120 may read the row 130 of the resistance-based memory device 110 to retrieve a data value stored in the data portion 112 (e.g., a data value 124) and to retrieve the ECC data 140 from the row 130. As shown in FIG. 1, the data value 124 corresponds to a hex "aaaaaaaaaaaaaaaaaaaaaaaaaaaaaaa8" rather than the data value 122 (e.g., a hex "aaaaaaaaaaaaaaaaaaaaaaaaaaaaaaaa"). The controller 120 may perform error correction on the data value 124 using the ECC data 140 and write the correct data value (e.g., a hex "aaaaaaaaaaaaaaaaaaaaaaaaaaaaaaaa"

value) back into the data portion 112 of the row 130. The controller 120 may perform a second read to read the row 130 again to retrieve the data value stored in the data portion 112 of the row 130 and compare the data value retrieved by the second read to the corrected data value to generate refresh data.

If the data value retrieved by the second read matches the corrected data value, the controller 120 may determine that the refresh data indicates a transient data error. The controller 120 may further determine that memory elements (e.g., MTJ elements) of the resistance-based memory device 110 corresponding to the row 130 have not failed (e.g., an insulation layer breakdown has not occurred) and may update the information stored in the BR row 152 of the BR memory device 150. For example, the controller 120 may update the first information 154 to a binary 0 value to indicate that a memory element failure has not been detected in the row 130.

If the data value retrieved by the second read does not match the corrected data value and an error bit location of the first read operation corresponds to an error bit location of the second read operation, the controller 120 may determine that the refresh data indicates a recurring data error. In a particular embodiment, a recurring data error occurs due to a failed memory element. For example, a MTJ element of the row 130 may have failed (e.g., an insulation layer breakdown may have occurred). In response to determining that the refresh data indicates a recurring data error, the controller 120 may identify a location of the recurring data error within the row 130. For example, the corrected data value and the retrieved data value match except for the fourth word 138. The controller 120 may determine that the failed memory element corresponds to bit position 1 of the fourth word 138 (e.g., a hex "a" value is represented in binary as 1010 and a hex "8" value is represented in binary as 1000). The controller 120 may update the information stored in the BR row 152 of the BR memory device 150 to indicate that data values retrieved from the row 130 are to be corrected based on the information stored in the BR row 152 of the BR memory device 150. For example, the BR memory device 150 may store a data value of "100000001" at the BR row 152, where the first information 154 corresponds to the "1" value (where "1" indicates a failed memory element) and the second information 156 corresponds to the "00000001" value (e.g., the bit position of the failed memory element). The BR memory device 150 may further store a data value of "1" after the second information 156 as the third information 158, where the third information 158 indicates a value that should appear at the bit position indicated by the second information 156.

After data is stored at the BR row 152 of the BR memory device 150, a memory address may be provided to the tag RAM 160. The memory address may correspond to the row (e.g., the row 130 of the resistance-based memory device 110) corresponding to the BR row 152 of the BR memory device 150. The BR memory device 150 may be configured to provide error correction data (e.g., an indication that a data value at a location corresponding to the second information 156 should be inverted or an indication that a data value at a location corresponding to the second information 156 should correspond to the third information 158) to the controller 120 in response to receiving the memory address at the tag RAM 160. In a first embodiment, the controller 120 may correct a first erroneous bit by inverting a value of the bit corresponding to the memory element identified by the second information 156 after receiving the data value from the resistance-based memory device 110. In this embodiment, no third information 158 is stored in the total tag RAM 160. For example, the controller 120 may invert the "0" in bit position 1 of the fourth word 138. In a second embodiment, the controller 120 may correct the first erroneous bit by replacing the bit with the third information 158. For example, the BR memory device 150 may store a data value of "1" at the third information 158 and the controller 120 may replace the "0" in bit position 1 of the fourth word 138 with the "1" of the third information 158.

Additionally, the controller 120 may correct a second erroneous bit of the data value using the ECC data 140 during a read operation that happens subsequent to the refresh operation. The second error correction operation may be performed subsequent to correcting the first erroneous bit using the BR memory device 150. As an illustrative example, as part of the refresh operation, the controller 120 may determine that the row 130 of the resistance-based memory device 110 includes a recurring data error (e.g., the data value 124 corresponds to a hex "aaaaaaaaaaaaaaaaaaaaaaaaaaaaaaa8" rather than the data value 122 (e.g., a hex "aaaaaaaaaaaaaaaaaaaaaaaaaaaaaaaa"). The controller 120 may instruct the BR memory device 150 to store a data value at the BR row 152, indicating that a memory element failed at bit position 1 of the row 130. During a subsequent read of the row 130, the controller 120 may receive a data value corresponding to a hex "aaaaaaaaaaaaaaaaaaaaaaaa2aaaaaa8" from the row 130 (e.g., the fourth word 138 includes the recurring data error at bit position 1 and a transient data error (a "0" instead of a "1") at bit position 31). The ECC data 140 alone may be unable to correct both the recurring data error and the transient data error (e.g., in the illustrative example, the ECC data 140 can only correct a one-bit error per word). The controller 120 may correct the recurring data error using the data stored at the BR row 152. Subsequently, the controller 120 may correct the transient data error using the ECC data 140 and the corrected data value (e.g., a hex "aaaaaaaaaaaaaaaaaaaaaaaa2aaaaaaa" where the recurring data error has been corrected) to produce the data value 122 (e.g., a hex "aaaaaaaaaaaaaaaaaaaaaaaaaaaaaaaa"). Thus, the BR row 152 of the BR memory device 150 enables correction of additional erroneous bit(s) that would otherwise not be corrected using only the ECC data 140.

An electronic device including the system 100 may use the BR memory device 150 to correct a data error and the ECC data 140 to correct another data error. Thus, the electronic device may recover from a hard fail while the electronic device is operating and without using a redundant memory device or a mirrored memory device. The electronic device may further use the BR memory device 150 to correct a data error more quickly, as compared to an electronic device that corrects the data error using only ECC data.

Figure 2:
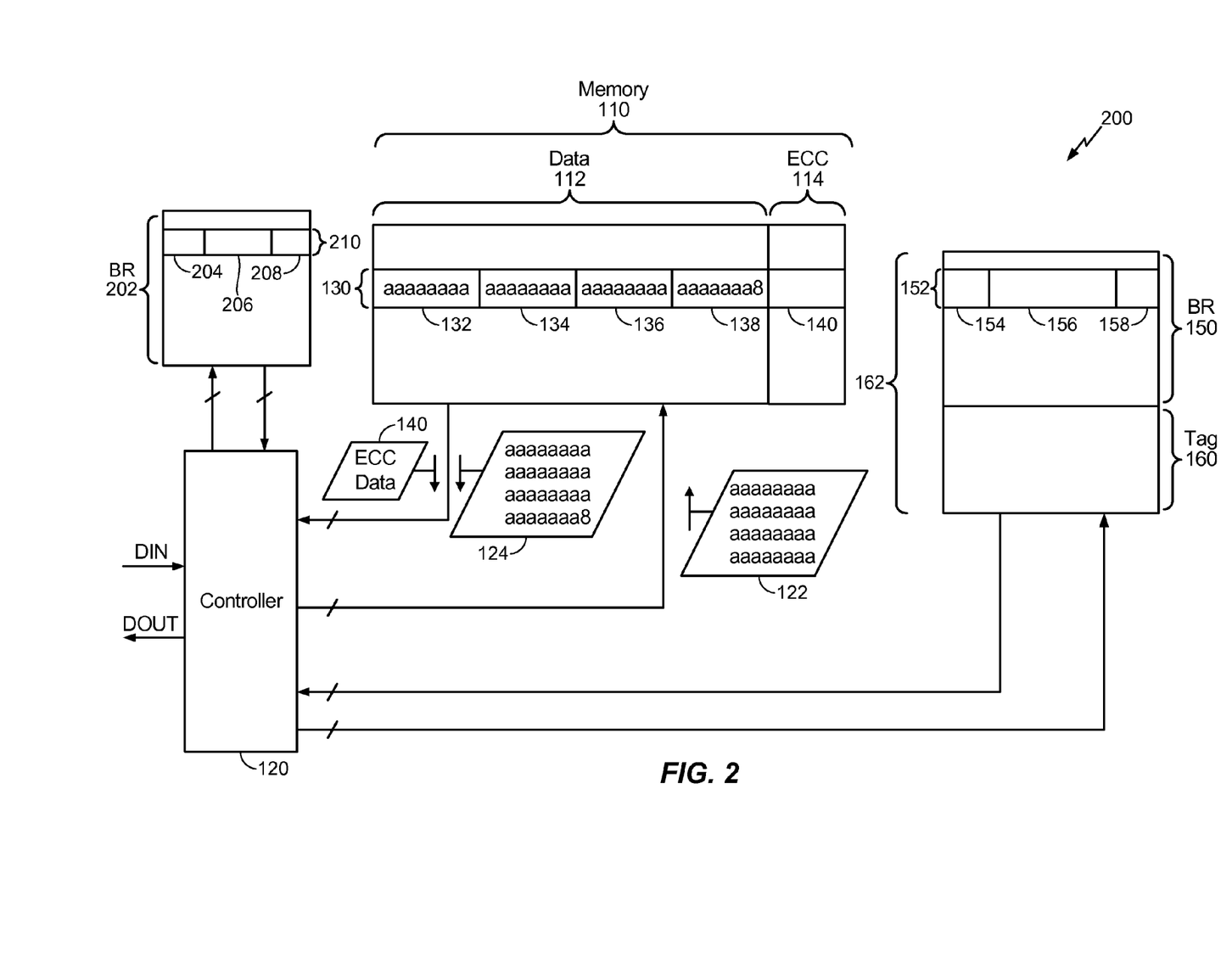
FIG. 2 is a diagram depicting a particular embodiment of a system including a memory, a tag memory, a first bit recovery memory, and a second bit recovery memory.

Referring to FIG. 2, a particular illustrative embodiment of a system 200 that includes the controller 120, the resistance-based memory device 110, the total tag memory 162 of FIG. 1, and a second bit recovery (BR) memory device 202 is shown. The controller 120, the resistance-based memory device 110, and the total tag memory 162 may function as described above with reference to FIG. 1.

In the embodiment illustrated in FIG. 2, the second BR memory device 202 is a non-volatile memory (e.g., magnetoresistive random-access memory (MRAM) or phase-change random-access memory (PCRAM)) and the BR memory device 150 is a volatile memory (e.g., static random-access memory (SRAM)). Reading data from the BR memory device 150 may be faster than reading data from the non-volatile memory. The second BR memory device 202 may include a plurality of BR rows, such as a representative BR row 210. Each row of the second BR memory device 202 may correspond to a row of a memory device. For example, the BR row 210 may correspond to the row 130 of the resistance-based memory device 110. Additionally, each row of the second BR memory device 202 may correspond to (e.g., mirror) a row of another BR memory device. In this example, the BR row 210 may correspond to the BR row 152 of the BR memory device 150. Thus, in this example, the BR row 210 corresponds to the BR row 152 and both the BR row 210 and the BR row 152 correspond to the row 130. As an illustrative example, each row of the BR memory device 150 corresponds to a different row of the resistance-based memory device 110. In the illustrative example, data stored in each row of the BR memory device 150 is mirrored in a corresponding row of the second BR memory device 202.

Each of the BR rows of the second BR memory device 202 may store information indicating whether a particular memory element (e.g., a MTJ device) of a corresponding row of the resistance-based memory device 110 has encountered a data error (e.g., an insulating layer breakdown). The information stored at the second BR memory device 202 may include error correction data used to correct a data error associated with a corresponding data value at the resistance-based memory device 110. Although FIG. 2 illustrates a single memory device that stores data values (e.g., the resistance-based memory device 110) and a single other BR memory (e.g., the BR memory device 150), the second BR memory device 202 may include BR rows corresponding to rows of more than one memory device that stores data values (e.g., four 64 kb MRAMs, where each MRAM includes 4 k 128-bit rows) and more than one other BR memory device.

The second BR memory device 202 may be configured to store information at a BR row in response to the information being stored at a corresponding row of the BR memory device 150. For example, the second BR memory device 202 may be configured to store first information 204 corresponding to the first information 154, second information 206 corresponding to the second information 156, and third information 208 corresponding to the third information 158 at the BR row 210 in response to the information being stored at the BR row 152. As explained above with reference to FIG. 1, because the BR memory device 150 stores the information in volatile memory, the information may be retrieved more quickly, as compared to retrieving the information from non-volatile memory. However, if the system 200 is powered down, information stored in volatile memory (e.g., the BR memory device 150) may be lost, but data and information stored in non-volatile memory (e.g., data stored at the resistance-based memory device 110, information stored at the second BR memory device 220, or both) may be retained. When information stored in the BR memory device 150 is lost, additional error detection processing (e.g., refresh operations) may be performed to detect (e.g., re-detect) recurring data errors at the resistance-based memory device 110 that were detected before the system 200 was powered down. The second BR memory device 202 may be used to initialize the BR memory device 150 via the controller 120 in response to a powerup of the system 200. Thus, information (e.g., information stored in the second BR memory device 210) regarding data errors at the resistance-based memory device 110 may be available at the BR memory device 150 without performing additional refresh operations to detect (e.g., re-detect) recurring data errors that were detected before the system 200 was powered down.

In the example illustrated in FIG. 2, the BR memory device 150 includes a BR row 152. In a particular embodiment, the BR row 152 includes error correction information corresponding to the row 130 of the resistance-based memory device 110. In the particular embodiment, the second BR memory device 202 includes a BR row 210 that corresponds to the BR row 152. When the system 200 loses power, the error correction information at the BR row 152 may be lost. When the system 200 regains power, the BR memory device 150 may be initialized (e.g., by the controller 120) by transferring the information stored in the BR row 210 to the BR row 152. Thus, information at the BR memory device 150 may be restored without performing a refresh operation at the resistance-based memory device 110. Then, the system 200 may use the error correction information to correct an erroneous bit in response to receiving a memory address corresponding to the row 130 at the tag RAM 160. The controller 120 may correct a first erroneous bit by inverting a value of the bit corresponding to the memory element identified by the second information 156 or by replacing the bit with the third information 158. Additionally, as described above with reference to FIG. 1, the controller 120 may correct a second erroneous bit of the data value using the ECC data 140. As described above with reference to FIG. 1, the error correction information of the BR row 152 may be updated following a refresh command or in response to information being stored at the row 130. The error correction information may further be stored at the BR row 210 following a refresh command or in response to information being stored at the row 130.

Figure 3:
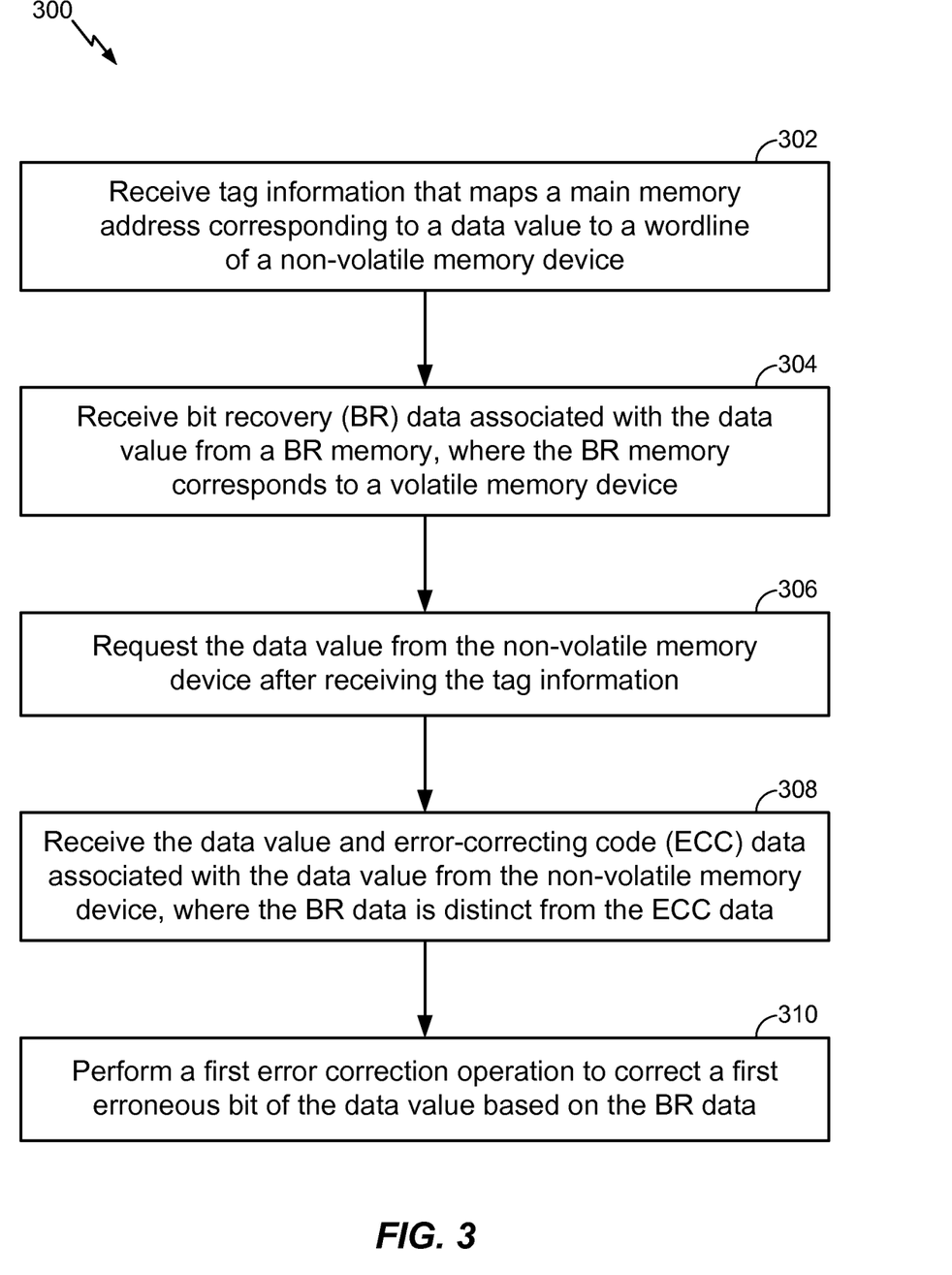
FIG. 3 is a flow chart that illustrates a method of recovering a bit.

FIG. 3 is a flowchart illustrating a particular embodiment of a method 300 of recovering a bit. The method includes, at 302, receiving tag information that maps a main memory address corresponding to a data value to a wordline of a non-volatile memory device. For example, the controller 120 of FIG. 1 may receive tag information from the tag random-access memory (RAM) 160. The tag information may map a main memory address corresponding to a data value to the row 130 of the resistance-based memory device 110. The method further includes, at 304, receiving bit recovery (BR) data associated with the data value from a BR memory, where the BR memory corresponds to a volatile memory device. For example, the controller 120 of FIG. 1 may receive BR data associated with the data value from the BR memory device 150, where the BR memory device 150 corresponds to a volatile memory device (e.g., static random-access memory (SRAM)). The tag information may be received before the BR data, the BR data may be received before the tag information, or the tag information and the BR data may be received concurrently or simultaneously.

The method further includes, at 306, requesting the data value from the non-volatile memory device after receiving the tag information. For example, the controller 120 of FIG. 1 may request the data value of the row 130 of the resistance-based memory device 110 after receiving the tag information. The method further includes, at 308, receiving the data value and error correcting code (ECC) data associated with the data value from the non-volatile memory device. For example, the controller 120 of FIG. 1 may receive the data value 122 and the ECC data 140 associated with the data value 122 from the resistance-based memory device 110. The BR data may be distinct from the ECC data. For example, the data of BR row 152 of FIG. 1 is distinct from the ECC data 140.

The method further includes, at 310, performing a first error correction operation to correct a first erroneous bit of the data value based on the BR data. For example, the controller 120 of FIG. 1 may perform an error correction operation to correct the bit position 1 of the data value 124. To illustrate, the data value 124 may be corrected to provide an output DOUT of a hex "aaaaaaaaaaaaaaaaaaaaaaaaaaaaaaaa" rather than a hex "aaaaaaaaaaaaaaaaaaaaaaaaaaaaaaa8." The corrected data value may be further corrected at the controller 120 or at another device using the ECC data 140. To illustrate, a data value of hex "aaaaaaaaaaaaaaaaaaaaaaa2aaaaaa8" may be corrected using the BR data to provide a corrected data value of hex "aaaaaaaaaaaaaaaaaaaaaaa2aaaaaaa" and the ECC data 140 may be used to further correct the corrected data value to provide an output DOUT of hex "aaaaaaaaaaaaaaaaaaaaaaaaaaaaaaaa."

The method 300 of FIG. 3 may be initiated by a processing unit such as a central processing unit (CPU), a field-programmable gate array (FPGA) device, an application-specific integrated circuit (ASIC), a controller, another hardware device, firmware device, or any combination thereof. As an example, the method 300 of FIG. 3 can be performed by one or more processors that execute instructions, as further described with reference to FIG. 4.

An electronic device operating according to the method 300 may use a BR memory device to correct a first data error and ECC data to correct a second data error. Thus, the electronic device may recover from a hard fail while the electronic device is operating and without using a redundant memory device or a mirrored memory device. The electronic device may further use the BR memory device to correct a data error more quickly, as compared to an electronic device that corrects the data error using only ECC data.

Figure 4:
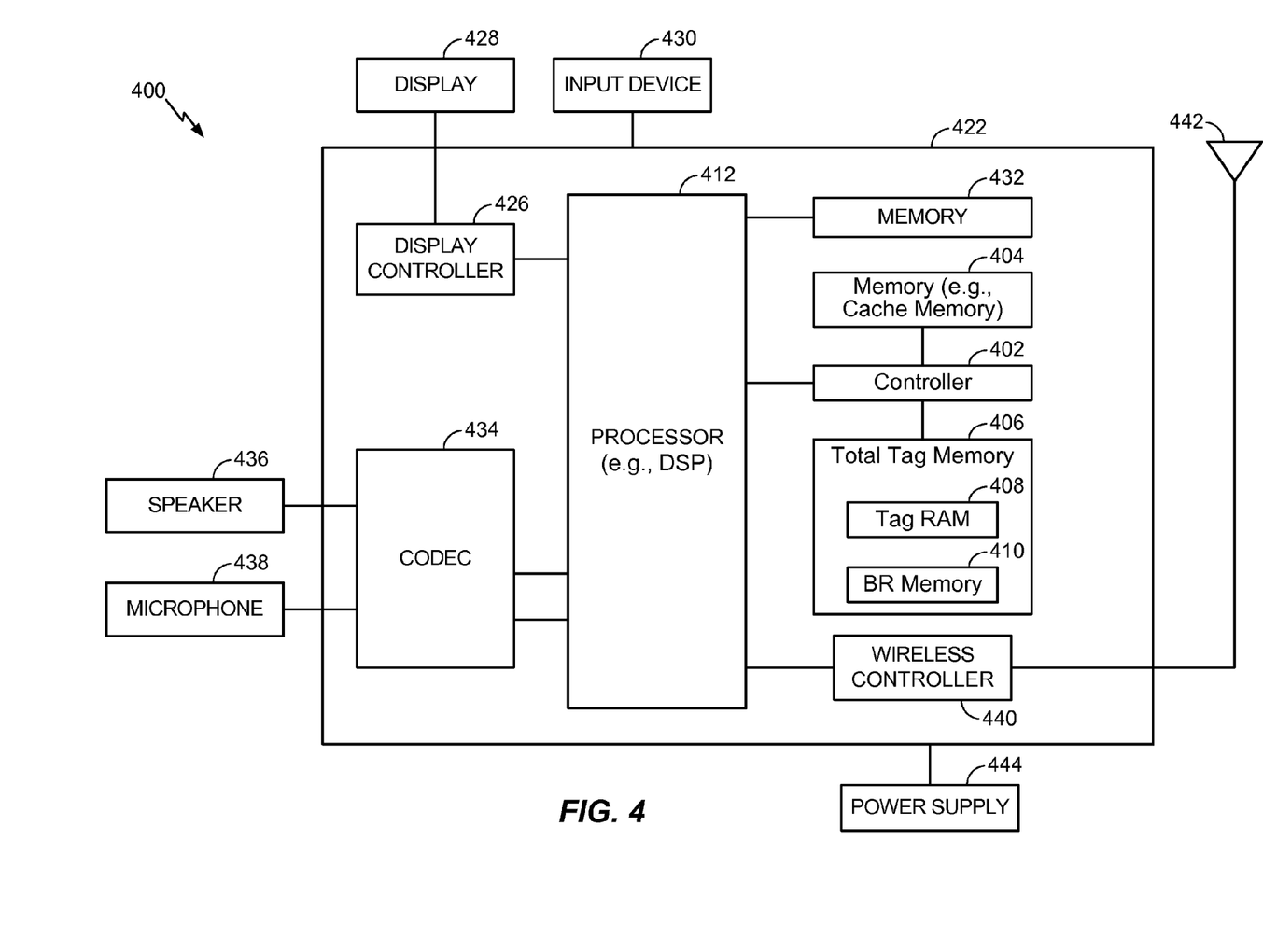
FIG. 4 is a block diagram that illustrates a communication device including a memory, a tag memory, and a bit recovery memory.

Referring to FIG. 4, a block diagram depicts a particular illustrative embodiment of a mobile device that includes a memory 402 (e.g., a cache memory), a controller 404, and a total tag memory 406 that includes a tag random-access memory (RAM) 408 and a bit recovery (BR) memory 410, the mobile device generally designated 400. The mobile device 400, or components thereof, may include, implement, or be included within a device such as: a communications device, a mobile phone, a cellular phone, a computer, a portable computer, a tablet, an access point, a set top box, an entertainment unit, a navigation device, a personal digital assistant (PDA), a fixed location data unit, a mobile location data unit, a desktop computer, a monitor, a computer monitor, a television, a tuner, a radio, a satellite radio, a music player, a digital music player, a portable music player, a video player, a digital video player, a digital video disc (DVD) player, or a portable digital video player.

The mobile device 400 may include a processor 412, such as a digital signal processor (DSP). The processor 412 may be coupled to a memory 432 (e.g., a non-transitory computer-readable medium). The processor 412 may be further coupled to the controller 404. The controller 404 may be further coupled to the memory 402 and to the total tag memory 406. The memory 402 may be configured to store a data value and error-correcting code (ECC) data associated with the data value. The tag RAM 408 may be configured to store information that maps memory addresses of a main memory (e.g., the memory 432) to wordlines of a cache memory. The cache memory may include or correspond to the memory 402. The BR memory 410 may be configured to store additional error correction data associated with the data value. The BR memory 410 may correspond to a volatile memory device. For example, the memory 402 may correspond to the resistance-based memory device 110 of FIG. 1 or FIG. 2. The controller 404 may correspond to the controller 120 of FIG. 1 or FIG. 2. The total tag memory 406 may correspond to the total tag memory 162. The tag RAM 408 may correspond to the tag RAM 160 of FIG. 1 or FIG. 2. The BR memory 410 may correspond to the BR memory device 150 of FIG. 1 or FIG. 2.

FIG. 4 also shows a display controller 426 that is coupled to the processor 412 and to a display 428. A coder/decoder (CODEC) 434 can also be coupled to the processor 412. A speaker 436 and a microphone 438 can be coupled to the CODEC 434. A wireless controller 440 can be coupled to the processor 412 and can be further coupled to an antenna 442.

In a particular embodiment, the processor 412, the display controller 426, the memory 432, the CODEC 434, the wireless controller 440, the memory 402, the controller 404, and the total tag memory 406 are included in a system-in-package or system-on-chip device 422. An input device 430 and a power supply 444 may be coupled to the system-on-chip device 422. Moreover, in a particular embodiment, and as illustrated in FIG. 4, the display 428, the input device 430, the speaker 436, the microphone 438, the antenna 442, and the power supply 444 are external to the system-on-chip device 422. However, each of the display 428, the input device 430, the speaker 436, the microphone 438, the antenna 442, and the power supply 444 can be coupled to a component of the system-on-chip device 422, such as an interface or a controller. The memory 402, the controller 404, and/or the total tag memory 406 may be included in the system-on-chip device 422, as shown in FIG. 4, or may be included in one or more separate components.

In conjunction with the described embodiments, an apparatus (such as the mobile device 400) may include means for storing a data value and ECC data associated with the data value (e.g., the resistance-based memory device 110 of FIG. 1 or FIG. 2 or the memory 402 of FIG. 4). The apparatus may further include means for storing mapping information (e.g., the tag RAM 160 of FIG. 1 or FIG. 2 or the tag RAM 408 of FIG. 4) that maps memory addresses of means for storing main data to wordlines of means for storing cache data. For example, the means for storing main data may include or correspond to the memory 432 of FIG. 4. The means for storing cache data may include the means for storing the data value and the ECC data. The apparatus may further include means for storing recovery bits (e.g., the BR memory device 150 of FIG. 1 or FIG. 2 or the BR memory 410 of FIG. 4) that stores additional error correction data associated with the data value. The means for storing recovery bits may include a volatile memory device.

As an illustrative example, the controller 404, the processor 412, or both, may initiate a step for receiving tag information that maps a main memory address corresponding to a data value to a wordline of a non-volatile memory device. For example, the processor 412 may transmit a memory address (e.g., corresponding to the memory 432) to the controller 404, and the controller 404 may transmit the memory address to the tag RAM 408. The controller 404 may receive tag information from the tag RAM 408. The tag information may map a main memory address (e.g., an address of the memory 432) to a wordline of a cache memory (e.g., a wordline of the memory 402).

The controller 404, the processor 412, or both, may also initiate a step for receiving BR data associated with the data value from a BR memory. The BR memory may correspond to a volatile memory device. For example, the controller 404 may receive BR data associated with the data value from the BR memory 410. The controller 404, the processor 412, or both, may also initiate a step for requesting the data value from the non-volatile memory device after receiving the tag information. For example, the controller 404 may request the data value from the memory 402 after receiving the tag information.

The controller 404, the processor 412, or both, may also initiate a step for receiving the data value and ECC data associated with the data value from the non-volatile memory device. The BR data may be distinct from the ECC data. For example, the controller 404 may receive the data value and the ECC data from the memory 402. The controller 404, the processor 412, or both, may also initiate a step for performing a first error correction operation to correct a first erroneous bit of the data value based on the BR data. For example, the controller 404 may perform an error correction operation on the data value based on the BR data.

Figure 5:
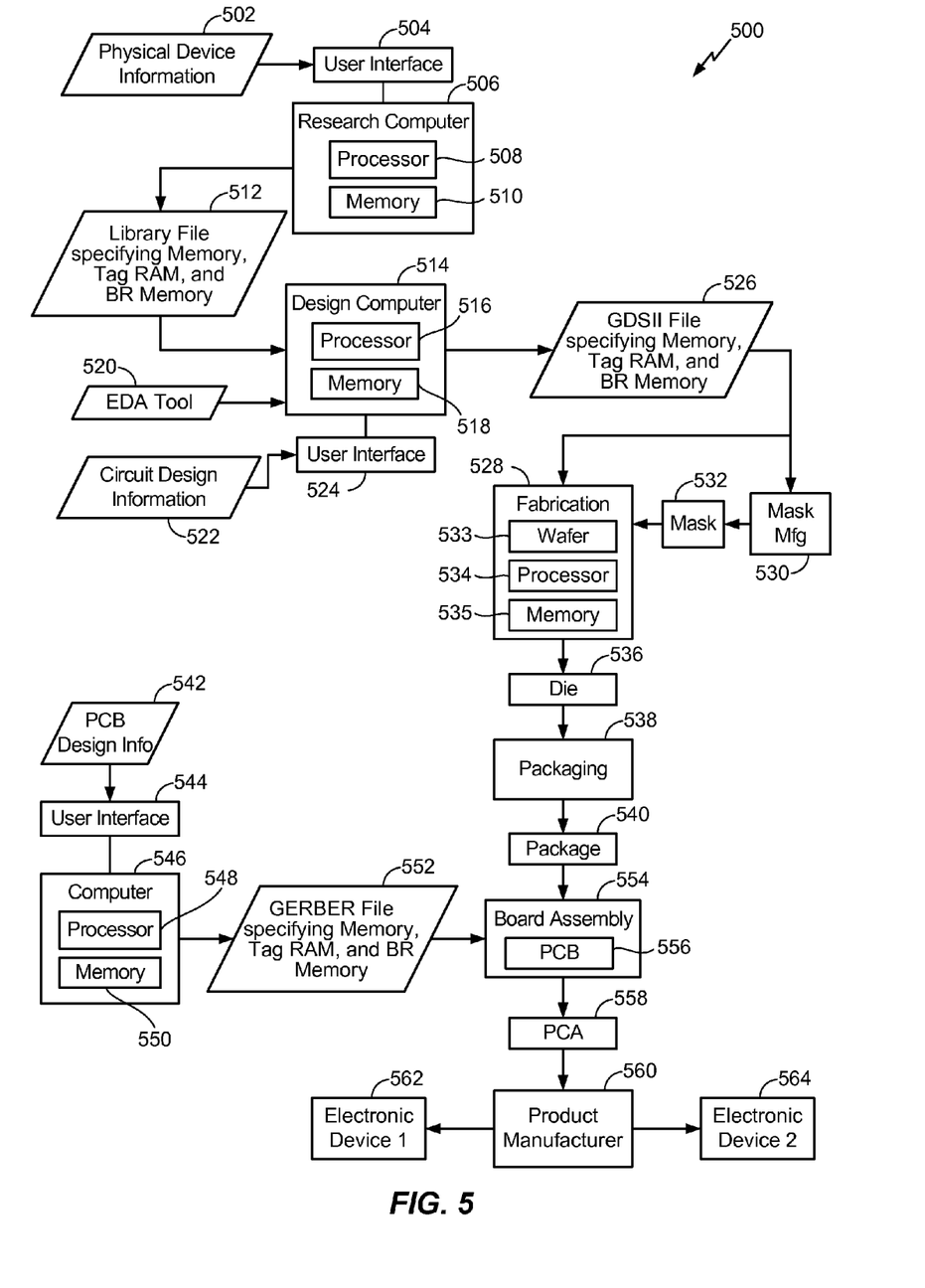
FIG. 5 is a data flow diagram that illustrates a particular illustrative embodiment of a manufacturing process to manufacture electronic devices that include a memory, a tag memory, and a bit recovery memory.

The foregoing disclosed devices and functionalities may be designed and configured into computer files (e.g. RTL, GDSII, GERBER, etc.) stored on computer-readable media. Some or all such files may be provided to fabrication handlers to fabricate devices based on such files. Resulting products include wafers that are then cut into dies and packaged into chips. The chips are then employed in devices described above. FIG. 5 depicts a particular illustrative embodiment of an electronic device manufacturing process 500.

Physical device information 502 is received at the manufacturing process 500, such as at a research computer 506. The physical device information 502 may include design information representing at least one physical property of an electronic device that includes one or more memories, such as a resistance-based memory device (e.g., corresponding to the resistance-based memory device 110 of FIG. 1 or FIG. 2), a tag random-access memory (RAM) (e.g., corresponding to the tag RAM 160 of FIG. 1 or FIG. 2), and/or a bit recovery (BR) memory (e.g., corresponding to the BR memory device 150 of FIG. 1 or FIG. 2). For example, the physical device information 502 may include physical parameters, material characteristics, and structure information that is entered via a user interface 504 coupled to the research computer 506. The research computer 506 includes a processor 508, such as one or more processing cores, coupled to a computer-readable medium such as a memory 510. The memory 510 may store computer-readable instructions that are executable to cause the processor 508 to transform the physical device information 502 to comply with a file format and to generate a library file 512.

In a particular embodiment, the library file 512 includes at least one data file including the transformed design information. For example, the library file 512 may include a library of electronic devices (e.g., semiconductor devices) that includes one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2), provided for use with an electronic design automation (EDA) tool 520.

The library file 512 may be used in conjunction with the EDA tool 520 at a design computer 514 including a processor 516, such as one or more processing cores, coupled to a memory 518. The EDA tool 520 may be stored as processor executable instructions at the memory 518 to enable a user of the design computer 514 to design a circuit that includes one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2), using the library file 512. For example, a user of the design computer 514 may enter circuit design information 522 via a user interface 524 coupled to the design computer 514. The circuit design information 522 may include design information representing at least one physical property of an electronic device that includes one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2). To illustrate, the circuit design property may include identification of particular circuits and relationships to other elements in a circuit design, positioning information, feature size information, interconnection information, or other information representing a physical property of an electronic device.

The design computer 514 may be configured to transform the design information, including the circuit design information 522, to comply with a file format. To illustrate, the file formation may include a database binary file format representing planar geometric shapes, text labels, and other information about a circuit layout in a hierarchical format, such as a Graphic Data System (GDSII) file format. The design computer 514 may be configured to generate a data file including the transformed design information, such as a GDSII file 526 that includes information describing one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2), in addition to other circuits or information. To illustrate, the data file may include information corresponding to a system-on-chip (SOC) or a chip interposer component that includes one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2), and that also includes additional electronic circuits and components within the SOC.

The GDSII file 526 may be received at a fabrication process 528 to manufacture one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2) according to transformed information in the GDSII file 526. For example, a device manufacture process may include providing the GDSII file 526 to a mask manufacturer 530 to create one or more masks, such as masks to be used with photolithography processing, illustrated in FIG. 5 as a representative mask 532. The mask 532 may be used during the fabrication process to generate one or more wafers 533, which may be tested and separated into dies, such as a representative die 536. The die 536 includes a circuit including one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2).

In a particular embodiment, the fabrication process 528 may be initiated by or controlled by a processor 534. The processor 534 may access a memory 535 that includes executable instructions such as computer-readable instructions or processor-readable instructions. The executable instructions may include one or more instructions that are executable by a computer, such as the processor 534.

The fabrication process 528 may be implemented by a fabrication system that is fully automated or partially automated. For example, the fabrication process 528 may be automated and may perform processing steps according to a schedule. The fabrication system may include fabrication equipment (e.g., processing tools) to perform one or more operations to form an electronic device. For example, the fabrication equipment may be configured to form integrated circuit elements using integrated circuit manufacturing processes (e.g., wet etching, dry etching, deposition, planarization, lithography, or a combination thereof).

The fabrication system may have a distributed architecture (e.g., a hierarchy). For example, the fabrication system may include one or more processors, such as the processor 534, one or more memories, such as the memory 535, and/or controllers that are distributed according to the distributed architecture. The distributed architecture may include a high-level processor that controls or initiates operations of one or more low-level systems. For example, a high-level portion of the fabrication process 528 may include one or more processors, such as the processor 534, and the low-level systems may each include or may be controlled by one or more corresponding controllers. A particular controller of a particular low-level system may receive one or more instructions (e.g., commands) from a high-level system, may issue sub-commands to subordinate modules or process tools, and may communicate status data back to the high-level system. Each of the one or more low-level systems may be associated with one or more corresponding pieces of fabrication equipment (e.g., processing tools). In a particular embodiment, the fabrication system may include multiple processors that are distributed in the fabrication system. For example, a controller of a low-level system component of the fabrication system may include a processor, such as the processor 534.

Alternatively, the processor 534 may be a part of a high-level system, subsystem, or component of the fabrication system. In another embodiment, the processor 534 includes distributed processing at various levels and components of a fabrication system.

Thus, the memory 535 may include processor-executable instructions that, when executed by the processor 534, cause the processor 534 to initiate or control formation of one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2).

The die 536 may be provided to a packaging process 538 where the die 536 is incorporated into a representative package 540. For example, the package 540 may include the single die 536 or multiple dies, such as a system-in-package (SiP) arrangement. The package 540 may be configured to conform to one or more standards or specifications, such as Joint Electron Device Engineering Council (JEDEC) standards.

Information regarding the package 540 may be distributed to various product designers, such as via a component library stored at a computer 546. The computer 546 may include a processor 548, such as one or more processing cores, coupled to a memory 550. A printed circuit board (PCB) tool may be stored as processor executable instructions at the memory 550 to process PCB design information 542 received from a user of the computer 546 via a user interface 544. The PCB design information 542 may include physical positioning information of a packaged electronic device on a circuit board, the packaged electronic device corresponding to the package 540 including one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2).

The computer 546 may be configured to transform the PCB design information 542 to generate a data file, such as a GERBER file 552 with data that includes physical positioning information of a packaged electronic device on a circuit board, as well as layout of electrical connections such as traces and vias, where the packaged electronic device corresponds to the package 540 including one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2). In other embodiments, the data file generated by the transformed PCB design information may have a format other than a GERBER format.

The GERBER file 552 may be received at a board assembly process 554 and used to create PCBs, such as a representative PCB 556, manufactured in accordance with the design information stored within the GERBER file 552. For example, the GERBER file 552 may be uploaded to one or more machines to perform various steps of a PCB production process. The PCB 556 may be populated with electronic components including the package 540 to form a representative printed circuit assembly (PCA) 558.

The PCA 558 may be received at a product manufacturer 560 and integrated into one or more electronic devices, such as a first representative electronic device 562 and a second representative electronic device 564. As an illustrative, non-limiting example, the first representative electronic device 562, the second representative electronic device 564, or both, may be selected from a mobile phone, a tablet, a computer, a communications device, a set top box, a music player, a video player, an entertainment unit, a navigation device, a personal digital assistant (PDA), and a fixed location data unit, into which one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2), are integrated. As another illustrative, non-limiting example, one or more of the electronic devices 562 and 564 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 5 illustrates remote units according to teachings of the disclosure, the disclosure is not limited to these illustrated units. Embodiments of the disclosure may be suitably employed in any device which includes active integrated circuitry including memory and on-chip circuitry.

A device that includes one or more memories, such as a resistance-based memory device (e.g., corresponding to the resistance-based memory device 110 of FIG. 1 or FIG. 2), a tag RAM (e.g., corresponding to the tag RAM 160 of FIG. 1 or FIG. 2), and/or a BR memory (e.g., corresponding to the BR memory device 150 of FIG. 1 or FIG. 2), may be fabricated, processed, and incorporated into an electronic device, as described in the illustrative manufacturing process 500. One or more aspects of the embodiments disclosed with respect to FIGS. 1-4 may be included at various processing stages, such as within the library file 512, the GDSII file 526, and the GERBER file 552, as well as stored at the memory 510 of the research computer 506, the memory 518 of the design computer 514, the memory 550 of the computer 546, the memory of one or more other computers or processors (not shown) used at the various stages, such as at the board assembly process 554, and also incorporated into one or more other physical embodiments such as the mask 532, the die 536, the package 540, the PCA 558, other products such as prototype circuits or devices (not shown), or any combination thereof. Although various representative stages are depicted with reference to FIGS. 1-4, in other embodiments fewer stages may be used or additional stages may be included. Similarly, the process 500 of FIG. 5 may be performed by a single entity or by one or more entities performing various stages of the manufacturing process 500.

In conjunction with the described embodiments, a non-transitory computer-readable medium stores instructions that, when executed by a processor, cause the processor to receive tag information that maps a main memory address corresponding to a data value to a wordline of a non-volatile memory device. The non-transitory computer readable medium may further store instructions that, when executed by the processor, cause the processor to receive bit recovery (BR) data associated with the data value from a BR memory. The BR memory may correspond to a volatile memory device. The non-transitory computer readable medium may further store instructions that, when executed by the processor, cause the processor to request the data value from the non-volatile memory device after receiving the tag information. The non-transitory computer readable medium may further store instructions that, when executed by the processor, cause the processor to receive the data value and error-correcting code (ECC) data associated with the data value from the non-volatile memory device. The BR data may be distinct from the ECC data. The non-transitory computer readable medium may further store instructions that, when executed by the processor, cause the processor to perform a first error correction operation to correct a first erroneous bit of the data value based on the BR data.

The non-transitory computer-readable medium may correspond to the memory 402 or the memory 432 of FIG. 4 or to the memory 510, the memory 518, or the memory 550 of FIG. 5. The processor may correspond to the processor 412 of FIG. 4 or to the processor 508, the processor 516, or the processor 548 of FIG. 5. The non-volatile memory device may correspond to the resistance-based memory device 110 of FIG. 1 or FIG. 2 or to the memory 402 of FIG. 4. The BR memory may correspond to the BR memory device 150 of FIG. 1 or FIG. 2 or the BR memory 410 of FIG. 4.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in memory, such as random-access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM). The memory may include any form of non-transient storage medium known in the art. An exemplary storage medium (e.g., memory) is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a resistance-based memory device configured to store a data value and error-correcting code (ECC) data associated with the data value;
a tag random-access memory (RAM) configured to store information that maps memory addresses of a main memory to wordlines of a cache memory, wherein the cache memory comprises the resistance-based memory device; and
a bit recovery (BR) memory configured to receive additional error correction data associated with the data value from another memory and to store the additional error correction data, wherein the BR memory corresponds to a volatile memory device.

2. The apparatus of claim 1, further comprising a total tag memory that comprises the BR memory and the tag RAM.

3. The apparatus of claim 1, wherein the tag RAM is configured, in response to receiving a memory address of the main memory, to provide a memory address of the cache memory corresponding to the memory address of the main memory or to indicate that the cache memory does not store data corresponding to the memory address of the main memory.

4. The apparatus of claim 1, wherein the resistance-based memory device comprises a Level 3 (L3) cache.

5. The apparatus of claim 1, wherein the BR memory is configured to provide the additional error correction data in response to the tag RAM receiving a request for a mapping associated with the data value.

6. The apparatus of claim 1, wherein the resistance-based memory device comprises a plurality of wordlines, wherein the data value and the ECC data are stored at a first wordline of the plurality of wordlines, and wherein the BR memory stores additional error correction data for each of the plurality of wordlines included in the resistance-based memory device.

7. The apparatus of claim 6, wherein the data value comprises a plurality of words, wherein the ECC data enables correction of a first erroneous bit in each of the plurality of words, and wherein the additional error correction data enables correction of a second erroneous bit in each of the plurality of words.

8. The apparatus of claim 1, further comprising a second BR memory, wherein the second BR memory is the other memory and corresponds to a non-volatile memory device, wherein the additional error correction data is mirrored between the BR memory and the second BR memory, and wherein the additional error correction data stored at the second BR memory is used to initialize the BR memory in response to a powerup of an electronic device that comprises the BR memory and the second BR memory.

9. The apparatus of claim 8, further comprising a controller to generate the additional error correction data associated with the data value and to store the additional error correction data at the BR memory and at the second BR memory.

10. The apparatus of claim 9, wherein the BR memory comprises a static random-access memory (SRAM) device and the second BR memory comprises a magnetoresistive random-access memory (MRAM) device.

11. The apparatus of claim 1, wherein the resistance-based memory device comprises a magnetoresistive random-access memory (MRAM) device.

12. The apparatus of claim 11, wherein the MRAM device comprises a magnetic tunnel junction (MTJ) device.

13. The apparatus of claim 1, further comprising a controller configured to cause the additional error correction data to be deleted based on a determination by the resistance-based memory device that an error writing the data value to the resistance-based memory device has occurred.

14. The apparatus of claim 1, integrated in at least one die.

15. The apparatus of claim 1, further comprising an electronic device selected from a mobile phone, a tablet, a computer, a communications device, a set top box, a music player, a video player, an entertainment unit, a navigation device, a personal digital assistant (PDA), and a fixed location data unit into which the resistance-based memory device, the tag RAM, and the BR memory are integrated.

16. A method comprising:
    storing bit recovery (BR) data received from a first memory at a BR memory, wherein the BR memory corresponds to a volatile memory device;
    receiving tag information that maps a main memory address corresponding to a data value to a wordline of a non-volatile memory device;
    receiving the BR data associated with the data value from the BR memory;
    requesting the data value from the non-volatile memory device after receiving the tag information;
    receiving the data value and error-correcting code (ECC) data associated with the data value from the non-volatile memory device, wherein the BR data is distinct from the ECC data; and
    performing a first error correction operation to correct a first erroneous bit of the data value based on the BR data.

17. The method of claim 16, further comprising performing a second error correction operation to correct a second erroneous bit of the data value based on the ECC data, wherein the second error correction operation is performed subsequent to the first error correction operation.

18. The method of claim 16, wherein the tag information is received from the volatile memory device.

19. The method of claim 18, wherein the BR memory is configured to provide the BR data in response to the volatile memory device receiving a request for the tag information.

20. The method of claim 16, further comprising generating the BR data in response to performing a refresh operation associated with the data value, wherein the BR data indicates a recurring data error at a memory element included in a particular wordline of the non-volatile memory device, and wherein the data value is stored at the particular wordline of the non-volatile memory device.

21. The method of claim 20, wherein the memory element is a failed memory element.

22. The method of claim 16, wherein the storing of the BR data at the BR memory further comprises writing the BR data from the first memory to the BR memory in response to a powerup of an electronic device that comprises the BR memory and the first memory, wherein the first memory is a second BR memory that corresponds to a second non-volatile memory device.

23. The method of claim 16, further comprising:
    in response to receiving new data to be written to a particular wordline of the non-volatile memory device, generating refresh data associated with the particular wordline of the non-volatile memory device;
    determining whether the refresh data indicates a presence of a recurring data error at a memory element included in the particular wordline of the non-volatile memory device;
    when the refresh data indicates the presence of the recurring data error, updating the BR data at the BR memory to include a bit value to be written to the memory element; and
    writing the new data to the particular wordline of the non-volatile memory device.

24. The method of claim 23, wherein the first memory is a second BR memory that corresponds to a second non-volatile memory device and further comprising updating the BR data at the second BR memory to include a bit value to be written to the memory element when the refresh data associated with the particular wordline indicates the presence of the recurring data error.

25. The method of claim 16, wherein requesting the data value and performing the first error correction operation are initiated by a processor integrated into an electronic device.

26. An apparatus comprising:
    means for storing a data value and error-correcting code (ECC) data associated with the data value;
    means for storing mapping information that maps memory addresses of means for storing main data to wordlines of means for storing cache data, wherein the means for storing cache data comprises the means for storing the data value and the ECC data; and
    means for storing recovery bits received from a first memory, wherein the recovery bits include additional error correction data associated with the data value, wherein the means for storing recovery bits comprises a volatile memory device.

27. The apparatus of claim 26, integrated in at least one die.

28. The apparatus of claim 26, further comprising an electronic device selected from a mobile phone, a tablet, a computer, a communications device, a set top box, a music player, a video player, an entertainment unit, a navigation device, a personal digital assistant (PDA), and a fixed location data unit into which the means for storing the data value and the ECC data, the means for storing mapping information, and the means for storing recovery bits are integrated.

29. A non-transitory computer readable medium storing instructions that, when executed by a processor, cause the processor to:
    store bit recovery (BR) data received from a first memory at a BR memory, wherein the BR memory corresponds to a volatile memory device;
    receive tag information that maps a main memory address corresponding to a data value to a wordline of a non-volatile memory device;
    receive the BR data associated with the data value from the BR memory;

request the data value from the non-volatile memory device after receiving the tag information;

receive the data value and error-correcting code (ECC) data associated with the data value from the non-volatile memory device, wherein the BR data is distinct from the ECC data; and perform a first error correction operation to correct a first erroneous bit of the data value based on the BR data.

30. The non-transitory computer readable medium of claim 29, further comprising a device selected from a fixed location data unit and a computer, into which the non-transitory computer readable medium is integrated.

31. A method comprising:

receiving tag information that maps a main memory address corresponding to a data value to a wordline of a non-volatile memory device;

receiving bit recovery (BR) data associated with the data value from a BR memory, wherein the BR memory corresponds to a volatile memory device;

requesting the data value from the non-volatile memory device after receiving the tag information;

receiving the data value and error-correcting code (ECC) data associated with the data value from the non-volatile memory device, wherein the BR data is distinct from the ECC data; and performing a first error correction operation to correct a first erroneous bit of the data value based on the BR data; and generating the BR data in response to performing a refresh operation associated with the data value, wherein the BR data indicates a recurring data error at a memory element included in a particular wordline of the non-volatile memory device, and wherein the data value is stored at the particular wordline of the non-volatile memory device.

32. The method of claim 31, wherein the memory element is a failed memory element.

33. A method comprising:

writing bit recovery (BR) data from a first memory to a BR memory in response to a powerup of an electronic device that comprises the BR memory and the first memory, wherein the BR memory corresponds to a volatile memory device, and wherein the first memory is a second BR memory that corresponds to a second non-volatile memory device receiving tag information that maps a main memory address corresponding to a data value to a wordline of a first non-volatile memory device;

receiving the BR data associated with the data value from the BR memory;

requesting the data value from the non-volatile memory device after receiving the tag information;

receiving the data value and error-correcting code (ECC) data associated with the data value from the non-volatile memory device, wherein the BR data is distinct from the ECC data; and performing a first error correction operation to correct a first erroneous bit of the data value based on the BR data.

34. A method comprising:

receiving tag information that maps a main memory address corresponding to a data value to a wordline of a non-volatile memory device;

receiving bit recovery (BR) data associated with the data value from a BR memory, wherein the BR memory corresponds to a volatile memory device;

requesting the data value from the non-volatile memory device after receiving the tag information;

receiving the data value and error-correcting code (ECC) data associated with the data value from the non-volatile memory device, wherein the BR data is distinct from the ECC data;

performing a first error correction operation to correct a first erroneous bit of the data value based on the BR data;

in response to receiving new data to be written to a particular wordline of the non-volatile memory device, generating refresh data associated with the particular wordline of the non-volatile memory device;

determining whether the refresh data indicates a presence of a recurring data error at a memory element included in the particular wordline of the non-volatile memory device;

when the refresh data indicates the presence of the recurring data error, updating the BR data at the BR memory to include a bit value to be written to the memory element; and writing the new data to the particular wordline of the non-volatile memory device.

35. The method of claim 34, further comprising updating the BR data at a second BR memory to include a bit value to be written to the memory element when the refresh data associated with the particular wordline indicates the presence of the recurring data error, wherein the second BR memory corresponds to a second non-volatile memory device.

* * * * *